(12) United States Patent
Kaufman

(10) Patent No.: US 6,361,256 B1
(45) Date of Patent: Mar. 26, 2002

(54) VEHICLE CARRIER

(76) Inventor: Robb Kaufman, 577 Cid Rd., Lexington, NC (US) 27292

( * ) Notice: Subject to any disclaimer, the term of this patent is extended or adjusted under 35 U.S.C. 154(b) by 0 days.

(21) Appl. No.: 09/531,966

(22) Filed: Mar. 21, 2000

(51) Int. Cl.⁷ .................................................. B60P 7/08
(52) U.S. Cl. ................ 410/26; 410/7; 410/24
(58) Field of Search ............................. 410/4, 7, 24, 26

(56) References Cited

U.S. PATENT DOCUMENTS

| | | | | |
|---|---|---|---|---|
| 1,887,325 A | * | 11/1932 | Pratt et al. ................. | 410/24 X |
| 1,925,665 A | * | 9/1933 | Judd et al. ..................... | 410/26 |
| 1,949,156 A | * | 2/1934 | Francis et al. ................ | 410/24 |
| 1,998,853 A | * | 4/1935 | Simning ...................... | 410/26 |
| 3,230,900 A | * | 1/1966 | Ruprecht et al. ............. | 410/26 |
| 4,278,375 A | * | 7/1981 | Drake et al. .................. | 410/26 |
| 4,420,165 A | * | 12/1983 | Goodin ..................... | 410/26 X |
| 6,161,997 A | * | 12/2000 | Furlong ....................... | 410/24 |

* cited by examiner

Primary Examiner—Stephen T. Gordon

(74) Attorney, Agent, or Firm—MacCord Mason PLLC

(57) ABSTRACT

A wedge-shaped vehicle carrier for supporting and transporting multi-vehicle loads having high structural strength and stability with a substantially decreased carrier weight. The vehicle carrier includes a lower frame having a forward end with a hitch for connecting the carrier to a truck and a rearward end downstream from the hitch and an upper deck having a face side and a back side. A triangular truss structure is positioned to distribute the load resting on and supported by the face side of the upper deck, the lower frame being positioned a spaced apart distance below the upper deck and connected to the upper deck by the triangular truss structure securedly attached between the back side of the upper deck and the lower frame. In the preferred embodiment, the truss structure includes a triangle truss component extending between the back side of the upper deck and the lower frame and a vertical component attached to and connecting the back side of the upper deck and the lower frame. Thus, the triangular truss structure is asymmetrically shaped but still provides substantial strengthening. Also, in the preferred embodiment, the carrier includes at least one downward lip securedly attached to and downwardly depending from the upper deck for removably attaching at least one positioner device for releasably anchoring the load to the face side of the upper deck.

30 Claims, 5 Drawing Sheets

VEHICLE CARRIER

BACKGROUND OF THE INVENTION

(1) Field of the Invention

The present invention relates generally to vehicle transporting carriers and, more particularly, to an improved "wedge" vehicle carrier which is substantially lighter and stronger than a conventional vehicle carrier of the same carrying capacity.

(2) Description of the Prior Art

Vehicle carriers are used as trailers for supporting and transporting loads of vehicles. Traditionally, the vehicle carriers are constructed of metal, usually high-strength steel. While the steel structure provides strength, it also has a significant weight. Often vehicle carriers weight between about 4000 to 8000 pounds without load. This "dead" weight reduces total carrying capacity or requires a larger towing vehicle than may be most economical.

While lighter weight metals like aluminum have been used by prior art carriers, the cost of the vehicle carrier is substantially increased thereby. While, decreasing carrier structure weight is advantageous because additional load can be transported, decreasing carrier structure weight also usually decreases carrier strength and stability and increases the likelihood of and amount of carrier structure deflection and failure. Furthermore, additional structural weight is added by additional components used for securing the vehicle loads to the carrier for transport.

While, eliminating additional non-supporting or non-structural components of vehicle carriers is one possible way to reduce overall carrier weight, many non-supporting or non-structural components are essential to ensuring safe and secure vehicle load anchorage for transport.

Generally, it is known in the prior art to employ a wedge-shaped vehicle carrier or trailer for providing adequate structural strength to support a load of more than one vehicle for transport. More preferably, the wedge-shaped vehicle carriers of the prior art are designed to support a load of about three to five vehicles for transport. As the wedge-shaped vehicle carriers were constructed to a larger scale to accommodate a larger number of vehicles, greater reinforcement within the wedge-shaped carrier structure is necessary to provide adequate strength to support that heavier load.

Prior art carriers generally have employed additional vertical components between the upper and lower frames in the support structure of the vehicle carrier, as shown in FIGS. 1A by TAKE3, 1B by SUN VALLEY and 1D by KAUFMAN TRAILERS. FIG. 1C shows a carrier structure designed by U'ALL and COUNTRYSIDE to have decreased weight by limiting the material in the carrier structure itself by using long I-beam.

Some of these prior art structures have also employed additional horizontal components for further reinforcement and partially non-vertical components above the running gear, as also shown in FIG. 1A. While the additional reinforcement components offered some increased strength and stability of the wedge-shaped vehicle carrier, the weight of the carrier was also substantially increased. Therefore, problems existed with prior art carriers having increased weight due to additional reinforcement components and deflection of the wedge-shaped carrier structure still occurred under load. Additionally, with the advent of larger sport utility vehicles, the prior art wedge-shaped vehicle carriers cannot accommodate the wider wheelbase without sacrificing vehicle stability and securing via traditional anchoring devices.

Thus, there remains a need for a new and improved vehicle carrier which is sufficiently strong to support large motor vehicles while, at the same time, is substantially lighter than a conventional vehicle carrier of the same carrying capacity.

SUMMARY OF THE INVENTION

The present invention is directed to a wedge-shaped vehicle carrier for supporting and transporting multi-vehicle loads having high structural strength and stability with a substantially decreased carrier weight. The vehicle carrier includes a lower frame having a forward end with a hitch for connecting the carrier to a truck and a rearward end downstream from the hitch and an upper deck having a face side and a back side. A triangular truss structure is positioned to distribute the load resting on and supported by the face side of the upper deck, the lower frame being positioned a spaced apart distance below the upper deck and connected to the upper deck by the triangular truss structure securely attached between the back side of the upper deck and the lower frame.

In the preferred embodiment, the truss structure includes a triangle truss component extending between the back side of the upper deck and the lower frame and a vertical component attached to and connecting the back side of the upper deck and the lower frame. Thus, the triangular truss structure is asymmetrically shaped but still provides substantial strengthening.

Also, in the preferred embodiment, the carrier includes at least one downward lip securely attached to and downwardly depending from the upper deck for removably attaching at least one positioner device for releasably anchoring the load to the face side of the upper deck.

By employing a triangular truss structure having vertical components and triangular truss components, the structural strength of a carrier constructed according to the present invention is increased by about fifty percent while the carrier weight is reduced by more than 1000 pounds or between about 10 and 25 percent of the overall weight of a similarly sized carrier, thereby permitting the transport load to be increased without compromising carrier strength.

Furthermore, the present invention provides an unrestricted support surface edge by providing anchoring means that extend below the vehicle load support surface; this unrestricted edge permits additional space for wider vehicles under transport. Thus, the present invention provides a lighter weight vehicle carrier that also provides adequate structural strength and stability for supporting and transporting multi-vehicle loads.

Accordingly, one aspect of the present invention is to provide a vehicle carrier for supporting a load in transport including a lower frame having a forward end with a hitch for connecting the carrier to a truck and a rearward end downstream from the hitch; an upper deck having a face side and a back side; and a triangular truss structure positioned to distribute the load resting on and supported by the face side of the upper deck, the lower frame positioned a spaced apart distance below the upper deck and connected to the upper deck by the triangular truss structure securely attached between the back side of the upper deck and the lower frame.

Another aspect of the present invention is to provide a vehicle carrier for supporting a load in transport including a lower frame having a forward end with a hitch for connecting the carrier to a truck and a rearward end downstream from the hitch; an upper deck having a face side and a back side; and a triangular truss structure positioned to distribute the load resting on and supported by the face side of the upper deck, the lower frame positioned a spaced apart distance below the upper deck and connected to the upper deck via the triangular truss structure securely attached between the back side of the upper deck and the lower frame, the truss structure including a triangle truss component extending between the back side of the upper deck and the lower frame and a vertical component attached to and connecting the back side of the upper deck and the lower frame wherein the triangular truss structure is asymmetrically shaped.

Still another aspect of the present invention is to provide a vehicle carrier for supporting a load in transport including a lower frame having a forward end with a hitch for connecting the carrier to a truck and a rearward end downstream from the hitch; an upper deck having a face side and a back side; a triangular truss structure positioned to distribute the load resting on and supported by the face side of the upper deck, the lower frame positioned a spaced apart distance below the upper deck and connected to the upper deck by the triangular truss structure securely attached between the back side of the upper deck and the lower frame, the truss structure including a triangle truss component extending between the back side of the upper deck and the lower frame and a vertical component attached to and connecting the back side of the upper deck and the lower frame wherein the triangular truss structure is asymmetrically shaped; and at least one downward lip securedly attached to and downwardly depending from the upper deck for removably attaching at least one positioner device for releasably anchoring the load to the face side of the upper deck.

These and other aspects of the present invention will become apparent to those skilled in the art after a reading of the following description of the preferred embodiment when considered with the drawings.

DESCRIPTION OF THE PREFERRED EMBODIMENTS

Figure 1A:
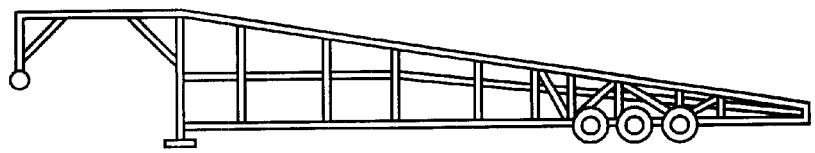
FIGS. 1A–1D are prior art vehicle carriers of a similar type to the present invention.
Figure 1B:
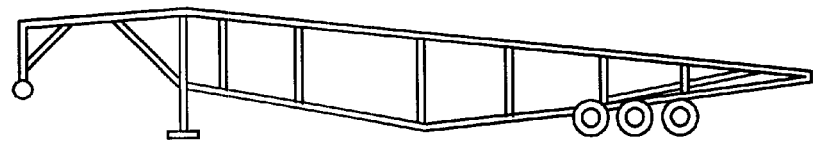
Figure 1C:
Figure 1D:
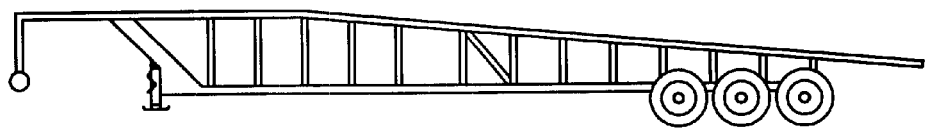

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
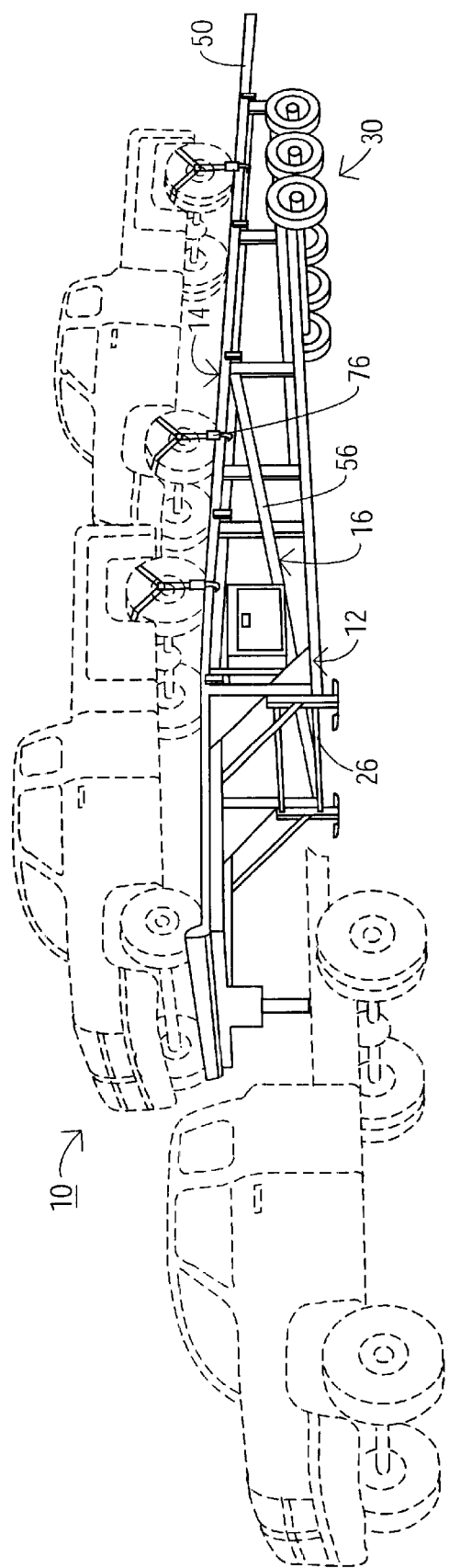
FIG. 2 is perspective view illustrating a vehicle carrier constructed according to the present invention.

Referring now to the drawings in general and FIG. 2 in particular, it will be understood that the illustrations are for the purpose of describing a preferred embodiment of the invention and are not intended to limit the invention thereto.

As best seen in FIG. 2, a vehicle carrier, generally designated 10, is shown constructed according to the present invention. The vehicle carrier 10 includes three major subassemblies: a lower frame 12; an upper deck 14; and a triangle truss support assembly 16, which provides support for the upper deck 14. In the preferred embodiment, vehicle carrier 10 also includes an improved tie down assembly 20.

Figure 3:
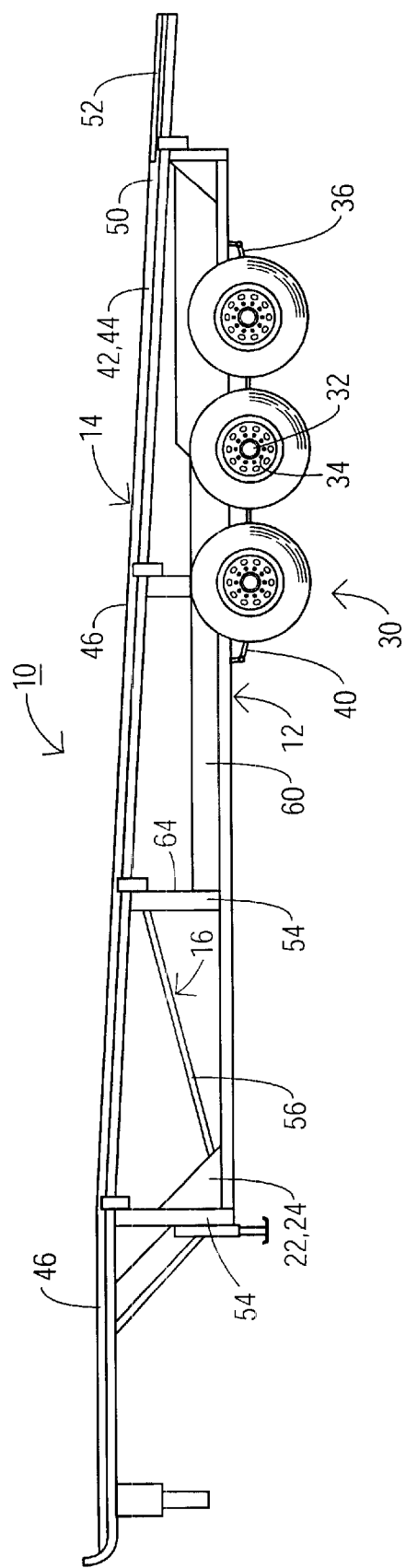
FIG. 3 is a side view of the vehicle carrier shown in FIG. 2.

As best seen in FIG. 3, lower frame 12 includes at least two frame runners 22, 24 and a plurality of cross braces 26 which extend between the frame runners to provide lateral support. Lower frame 12 also includes running gear 30. Running gear 30 includes at least one axial 32 to receiving a plurality of wheels and mounting means 34. Mounting 34 may include hangers 36 attached directly to frame members 22, 24 and suspension means 40. The suspension means 40 may include conventional springs or a torque axial assembly.

Upper deck 14 includes at least one pair of deck runners 42, 44 extending the length of the vehicle carrier 10. Decking 46 is directly attached along each pair of deck runners 42, 44 for supporting one or more vehicles. Decking 46 may be mesh or deck plate depending on the vehicle application.

In the preferred embodiment, ramps 50 and ramp tracks 52 are formed into the rear portion of upper deck 14 which allows ramps 50 to be extended by the operator when needed to load or unload a vehicle and are pushed up into ramp tracks 52 when the vehicle is loaded.

The triangle truss support assembly 16 includes at least one pair of triangle truss members 56 attached between the lower frame 12 and the upper deck 14, along with a plurality of vertical support members 54. In a preferred embodiment, triangle truss support assembly 16 is asymmetrical. As used herein, asymmetrical refers that each truss member 56 is located towards the front-end of the trailer with the upper deck 14 providing the rearward portion of the truss.

According to the present invention, the asymmetrical truss member may be between 25 percent and 66 percent towards the front of the vehicle carrier 10. In the preferred embodiment, for a carrier 10 of about 40 feet in length, the truss would be about 24 feet behind and 16 feet towards the front of the carrier.

Also in the preferred embodiment, the lower frame 12 may include lower frame reinforcing members 60 located adjacent to the running gear 30. The lower frame reinforcing members 60 are downstream from the triangle truss support assembly 16 and, preferably, is abutted against it at location 64. Also, in the preferred embodiment, vertical members located between truss members 56 and lower frame reinforcing members 60 may have a substantially increased width in order to provide a much larger attachment surface to the end of truss number 56.

Figure 4:
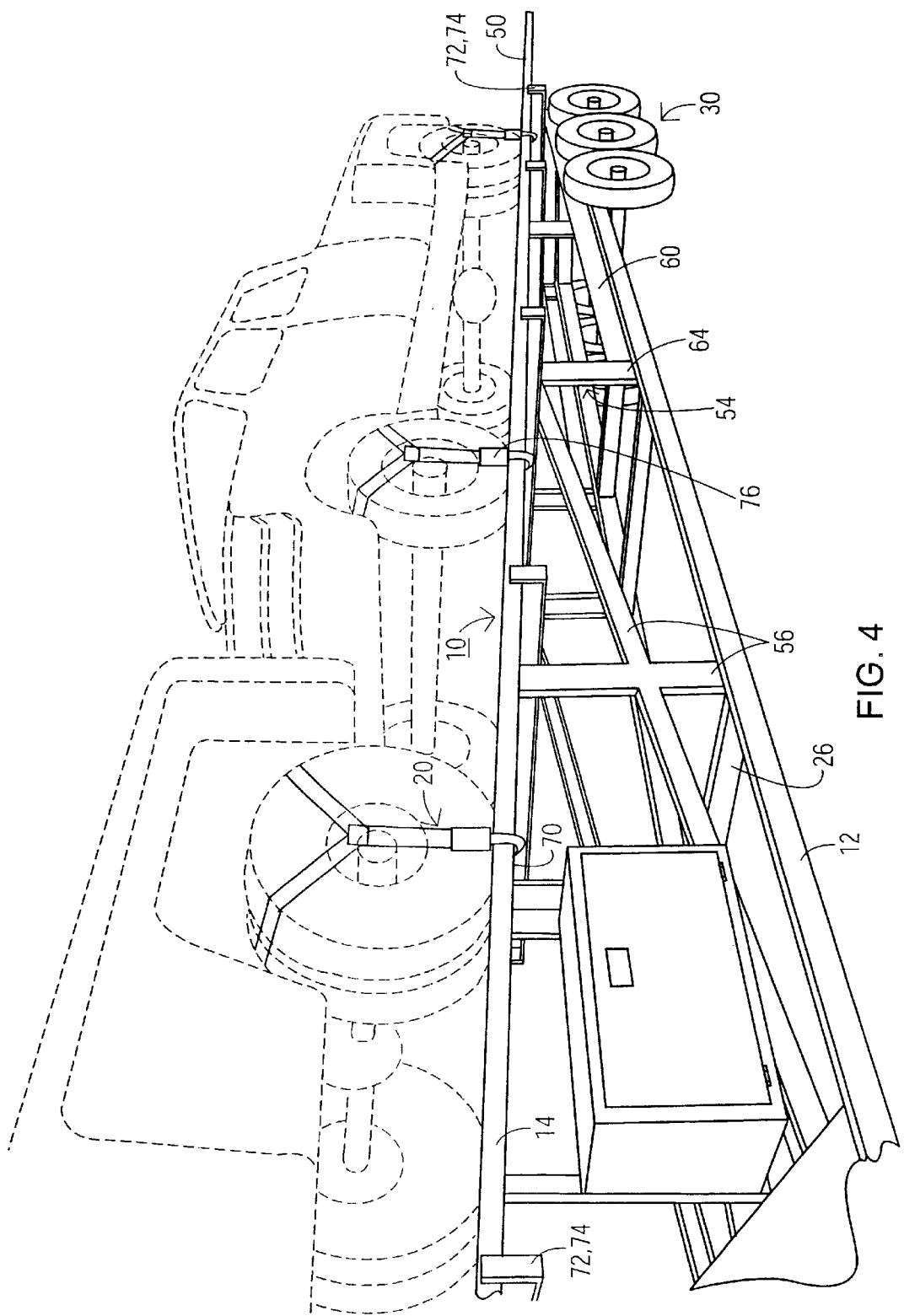
FIG. 4 is an enlarged side view of the vehicle carrier show in FIG. 2, illustrating the improve tie down system of the present invention.
Figure 5:
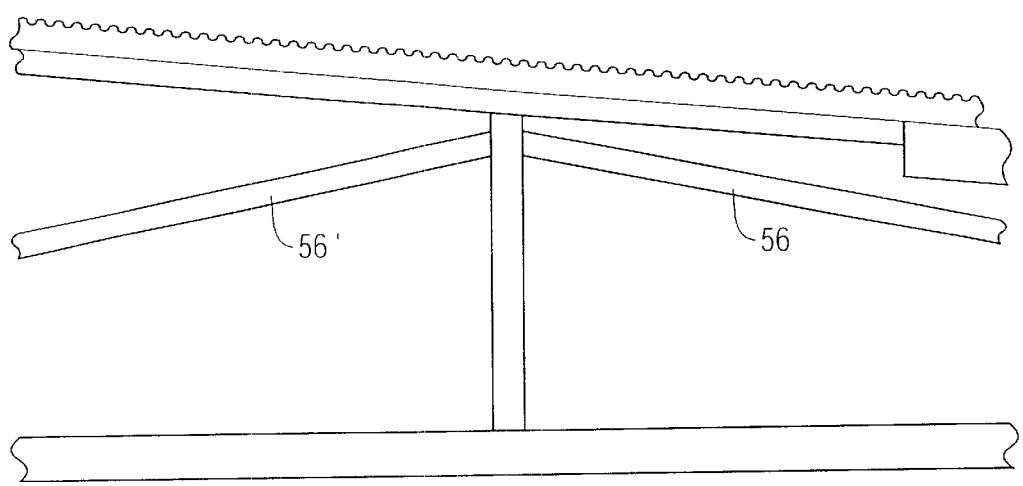
FIG. 5 is a side view of the vehicle carrier shown in FIG. 2 illustrating an alternative embodiment in which a symmetrical truss support is utilized.

Turning to FIG. 4, there is shown a further enlarged side view of the center portion of vehicle carrier 10, illustrating the tie down assembly 20. As can be seen, the outer edge of the upper deck 14 further includes a downwardly extending lip 70. Lip 70 allows a wheel net to be attached directly to a vehicle wheel and secured onto the downwardly extending lip 70. In the preferred embodiment, downwardly extending lip 70 extends the fall length of the vehicle. Also, in the preferred embodiment, a strap support and cross brace 72, 74 extends along attached to the decking edge to secure the lip 70 to the upper deck 14. This arrangement allow, the vehicles to be secured almost anywhere along the length of the vehicle carrier without being specifically position with respect to a ratchet tie down. However, in the preferred embodiment, conventional ratchet tie downs 76 can also be used where additional security is required Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A vehicle carrier for supporting a load in transport comprising:
    (a) a lower frame having a forward end with a hitch for connecting the carrier to a truck and a rearward end downstream from the hitch;
    (b) an upper deck having a face side and a back side;
    (c) a triangular truss structure positioned to distribute the load resting on and supported by the face side of the upper deck, the lower frame positioned a spaced apart distance below the upper deck and connected to the upper deck via said triangular truss structure securedly attached between the back side of the upper deck and the lower frame, said truss structure including a triangle truss component extending between the back side of the upper deck and the lower frame and a vertical component attached to and connecting the back side of the upper deck and the lower frame wherein said triangular truss structure is asymmetrically shaped; and
    (d) a lower frame reinforcement beam positioned substantially parallel to and attached to the lower frame.

2. The vehicle carrier according to claim 1, wherein the asymmetrical shape of said triangular truss structure has a front orientation such that a longer non-hypotenuse leg is downstream from the hitch.

3. The vehicle carrier according to claim 2, wherein the longer non-hypotenuse leg has a downstream end securedly attached to the back side of the upper deck at a position located between about 40% and 80% of the length of the upper deck, measured from the rear end of the upper deck, and the longer non-hypotenuse leg has an upstream end securedly attached to the forward end of the lower frame.

4. The vehicle carrier according to claim 3, wherein the downstream end of the longer non-hypotenuse leg is securedly attached to the back side of the upper deck at a position located 60% of the length of the upper deck, measured from the rear end of the upper deck.

5. The vehicle carrier according to claim 1, wherein the reinforcement beam extends from the rearward end of the lower frame to a position on the lower frame where the vertical component attaches to the lower frame, corresponding to a position on the upper deck between about 40% and 80% of the length of the upper deck, measured from the rear end of the upper deck.

6. The vehicle carrier according to claim 5, wherein the reinforcement beam extends from the rearward end of the lower frame to a position on the lower frame where the vertical component attaches to the lower frame, corresponding to a position on the upper deck about 60% of the length of the upper deck, measured from the rear end of the upper deck.

7. The vehicle carrier according to claim 1, wherein the vertical component is at between about 4 inches and 6 inches wide.

8. The vehicle carrier according to claim 1, wherein the lower frame reinforcement beam abuts said triangular truss structure.

9. A vehicle carrier for supporting a load in transport comprising:
    (a) a lower frame having a forward end with a hitch for connecting the carrier to a truck and a rearward end downstream from the hitch;
    (b) an upper deck having a face side and a back side;
    (c) a triangular truss structure positioned to distribute the load resting on and supported by the face side of the upper deck, the lower frame positioned a spaced apart distance below the upper deck and connected to the upper deck by said triangular truss structure securedly attached between the back side of the upper deck and the lower frame, said truss structure including a triangle truss component extending between the back side of the upper deck and the lower frame and a vertical component attached to and connecting the back side of the upper deck and the lower frame wherein said triangular truss structure is asymmetrically shaped; and
    (d) at least one downward lip securedly attached to and downwardly depending from the upper deck for removably attaching at least one positioner device for releasably anchoring the load to the face side of the upper deck.

10. The vehicle carrier according to claim 9, wherein the downward lip extends the full length of the upper deck.

11. The vehicle carrier according to claim 9, further including at least one strap support connected to a corresponding at least one crosspiece and attached to the upper deck and the at least one downward lip for reinforcing the at least one downward lip.

12. The vehicle carrier according to claim 9, further including a ratchet tie down system attached to the back side of the upper deck and positioned between the upper deck and the lower frame for tying down the load.

13. The vehicle carrier according to claim 9, further including at least two frame runners fixedly positioned substantially parallel to each other and connected by a plurality of spaced apart cross-braces attached to the at least two frame runners and substantially perpendicular to the at least two frame runners, the at least two frame runners extending the length of the vehicle carrier and attached to the lower frame.

14. The vehicle carrier according to claim 9, further including running gear connected to the lower frame downstream from the hitch.

15. The vehicle carrier according to claim 14, further including at least one axle and mounting means for mounting the running gear and at least one axle onto the lower frame.

16. The vehicle carrier according to claim 15, wherein the mounting means are hangers.

17. The vehicle carrier according to claim 15, wherein the mounting means are spring means.

18. The vehicle carrier according to claim 15, wherein the mounting means is a torsion axle.

19. The vehicle carrier according to claim 9, further including a deck providing a substantially horizontal surface and at least one pair of deck runners fixedly positioned substantially parallel to each other, with at least one pair of deck runners extending the length of the vehicle carrier and attached to the back side of the upper deck and positioned to support and to reinforce the decking material forming the upper deck.

20. The vehicle carrier according to claim 19, wherein the decking material is an open mesh.

21. The vehicle carrier according to claim 19, wherein the decking material is deck plate.

22. The vehicle carrier according to claim 21, wherein the decking material is directly attached to the deck runners.

23. The vehicle carrier according to claim 9, further including a pair of ramps positioned at a rear end of the upper deck, the pair of ramps having a front end and a back end, the pair of ramps slidably connected to the upper deck and positioned to slide within a corresponding pair of ramp tracks positioned lengthwise to the upper deck and attached to the back side of the upper deck such that when the pair of ramps is in an extended position, the back end of the pair of ramps is substantially abuts the back end of the upper deck and the front end of the pair of ramps extends beyond the length of the upper deck, and when the pair of ramps is in a retracted position, the pair of ramps is positioned within the ramp tracks such that the back end of the pair of ramps does not substantially extend beyond the upper deck.

24. The vehicle carrier according to claim 9, wherein the asymmetrical shape of said triangular truss structure has a front orientation such that a longer non-hypotenuse leg is downstream from the hitch.

25. The vehicle carrier according to claim 24, wherein the longer non-hypotenuse leg has a downstream end securely attached to the back side of the upper deck at a position located between about 40% and 80% of the length of the upper deck, measured from the rear end of the upper deck, and the longer non-hypotenuse leg has an upstream end securely attached to the forward end of the lower frame.

26. The vehicle carrier according to claim 25, wherein the downstream end of the longer non-hypotenuse leg is securely attached to the back side of the upper deck at a position located 60% of the length of the upper deck, measured from the rear end of the upper deck.

27. The vehicle carrier according to claim 9, further including a lower frame reinforcement beam positioned substantially parallel to and attached to the lower frame, the reinforcement beam extending from the rearward end of the lower frame to a position on the lower frame where the vertical component attaches to the lower frame, corresponding to position on the upper deck between about 40% and 80% of the length of the upper deck, measured from the rear end of the upper deck.

28. The vehicle carrier according to claim 27, wherein the reinforcement beam extends from the rearward end of the lower frame to a position on the lower frame where the vertical component attaches to the lower frame, corresponding to position on the upper deck about 60% of the length of the upper deck, measured from the rear end of the upper deck.

29. The vehicle carrier according to claim 9, wherein the vertical component is at between about 4 inches and 6 inches wide.

30. The vehicle carrier according to claim 27, wherein the lower frame reinforcement beam abuts said triangular truss structure.

* * * * *